United States Patent
Freidell

(10) Patent No.: US 7,032,840 B2
(45) Date of Patent: Apr. 25, 2006

(54) ANIMAL BATHING SYSTEM

(75) Inventor: James E. Freidell, Littleton, CO (US)

(73) Assignee: Hair Patrol LLC, Littleton, CO (US)

( * ) Notice: Subject to any disclaimer, the term of this patent is extended or adjusted under 35 U.S.C. 154(b) by 254 days.

(21) Appl. No.: 10/165,020

(22) Filed: Jun. 7, 2002

(65) Prior Publication Data
US 2003/0024485 A1    Feb. 6, 2003

Related U.S. Application Data

(60) Provisional application No. 60/296,831, filed on Jun. 8, 2001.

(51) Int. Cl.
*A62C 13/62* (2006.01)

(52) U.S. Cl. .......... 239/307; 239/74; 239/127; 239/142; 239/304; 239/305; 239/310; 239/413; 239/432; 239/530; 239/588; 239/590.5; 119/665

(58) Field of Classification Search .......... 239/10, 239/302, 303, 304, 305, 124, 127, 407, 413, 239/432, 526, 530, 590, 575, 590.5, 588, 239/71, 74, 142, 307, 310, 318; 119/651, 119/600, 602, 665, 604; 4/553, 624, 625, 4/695
See application file for complete search history.

(56) References Cited

U.S. PATENT DOCUMENTS

| 1,233,557 A | 7/1917 | Curtis |
| 1,826,163 A | 10/1931 | Barber et al. |
| 2,563,002 A | 8/1951 | Bissell et al. |
| 3,409,274 A | 11/1968 | Lawton |
| 3,788,557 A | 1/1974 | Breunsbach |

(Continued)

FOREIGN PATENT DOCUMENTS

EP    0 861 590 A1    9/1998

OTHER PUBLICATIONS

Linda (last name unknown), "The Groomers Shampoo System." http://www.sota-oh.com/users/petstyles. 2000.

(Continued)

*Primary Examiner*—Steven J. Ganey
(74) *Attorney, Agent, or Firm*—Faegre & Benson LLP

(57) ABSTRACT

A bathing system is disclosed. The system includes a water supply line, an injectant supply line for supplying an injectant such as shampoo and conditioner, and an injector for combining the water and injectant and homogenizing the mixture. The system also includes a sprayer, which is connected to the outlet of the injector and is capable of producing a pulsating spray. Additional injectant supply line or lines can also be included. The injectant lines can be combined with a distribution manifold and in turn fed into the injector. In a preferred embodiment, the injector is of a differential pressure type. A bypass path and valve switch water directing to the sprayer for rinsing without mixing with injectant. The injector and sprayer are configured to produce a water-injectant mixture with a consistent mixing ratio over a wide range of water flow rates and pressures while providing pulsating action in either the wash or rinse cycle.

102 Claims, 8 Drawing Sheets

U.S. PATENT DOCUMENTS

| | | | |
|---|---|---|---|
| 3,799,195 A | | 3/1974 | Hermans |
| 3,850,371 A | | 11/1974 | Trapp |
| 3,942,724 A | | 3/1976 | Mocarski |
| 4,029,260 A | * | 6/1977 | Herrick .................. 239/310 |
| 4,123,800 A | | 10/1978 | Mazzei |
| 4,174,812 A | | 11/1979 | Hechler, IV |
| 4,364,516 A | | 12/1982 | Rhoades et al. |
| 4,558,823 A | | 12/1985 | Groth |
| 4,565,160 A | * | 1/1986 | Cook ..................... 119/665 |
| 5,174,503 A | * | 12/1992 | Gasaway ................ 239/307 |
| 5,193,487 A | * | 3/1993 | Vogel ......................... 4/555 |
| 5,518,020 A | | 5/1996 | Nowicki et al. |
| 5,678,593 A | | 10/1997 | Lockhart |
| 5,769,029 A | * | 6/1998 | Marshall ................ 119/651 |
| 5,863,128 A | * | 1/1999 | Mazzei ................. 366/163.2 |
| 6,293,294 B1 | | 9/2001 | Loeb et al. |
| 6,455,017 B1 | * | 9/2002 | Kasting et al. ............. 239/318 |

OTHER PUBLICATIONS

Author Unknown, "Coat and Skin Care Solutions." Best Shot. Date unknown.

Author Unknown, "Installation Manual, HydroSurge Power-Bather Model 711-3." HydroSurge, Inc, Animal Bathing Systems. Date unknown.

Author Unknown, "Cosmos Shampoo Systems." Cosmos Corporation. 1995.

Author Unknown, "Chemical Blending System, Operations Manual." AFI.

Gustavson, William R. "Letter to Michael A. DeSanctis regarding Hair Patrol, LLC.", 2005.

* cited by examiner for $p_3 \ll p_2$;

$p_2 = p_1 + \frac{1}{2}\rho(v_1^2 - v_2^2)$; where $\rho$ = fluid density

ANIMAL BATHING SYSTEM

CROSS REFERENCE TO RELATED APPLICATION

The present application claims priority to U.S. Provisional Application No. 60/296,831 filed Jun. 8, 2001.

FIELD OF THE INVENTION

The present invention relates generally to an animal bathing system and more particularly to a bathing system having a plurality of storage bottles.

BACKGROUND OF THE INVENTION

Animals are conventionally washed by hand. This requires the application of water, cleaning and conditioning agents and is a highly labor intensive operation. The result is that hand washing is slow, laborious, and does not produce uniform results, since neither thorough washing nor thorough rinsing can be assured.

Several devices have been created to assist with animal washing. Some pre-existing devices utilize water re-circulation, while other devices use water on a once-through basis. Yet other devices use a selector valve or valves permitting the selection among various products for mixing (with water) and dispensing of only one product at a time.

Early animal bathing systems used a sump pump or bilge-type in the tub to re-circulate and reuse mixed product while bathing an animal. The sump pump was placed over the drain in the tub. The tub was filled with some water. Shampoo or conditioner product was poured in the tub near the sump pump. The pump was then activated to pump the resulting mixture through a hose and onto the animal. Some professionals don't care to reuse product in this fashion out of the belief that they will be putting dirty water back on the animal, re-circulating the mixture. Yet, others remain ingrained to this type of operation out of the belief that such operation dramatically saves shampoo and conditioner product consumption.

SUMMARY OF THE INVENTION

According to one embodiment of the present invention, an animal bathing system includes a plurality of bottles, each bottle connected to a control valve that allows injectant flow from each bottle to be independently opened or closed. The inputs of a distribution manifold are connected to each control valve. The output of the distribution manifold is connected to the injectant input of an injector. The primary input of the injector is connected to a variable temperature and flow water source. A bypass valve is connected between the primary input and the output of the injector. A low-pressure hand held pulsating spray unit is connected to the output of the injector.

In one embodiment of the present invention, an animal bathing system uses an injector having a substantially constant mixture ratio over a wide range of primary input pressure.

In one embodiment of the present invention, an animal bathing system uses an injector having a substantially constant mixture ratio over a wide range of primary input pressure, output back pressure, resultant motive flow velocity, and injectant specific gravity, density, viscosity, and stickiness.

In one embodiment of the present invention, an animal bathing system uses an agitator, such as a re-circulating pump, to stir the injectant in a bottle of an animal washing system.

In one embodiment of the present invention, an animal bathing system that uses a non-opaque bottle or other feature, such as a hollow indicator tube, that allows the user to ascertain whether adequate product is available for dispensing and the identity of the product.

In one embodiment of the present invention, an animal bathing system uses water (and injectant) flow to induce rotary action through a series of gearing that rapidly and repetitively shuts off and turns back on the water flow, giving rise to a pulsating water flow action.

In one embodiment of the present invention, an animal bathing system is capable of using a variety of pumps, including linear, rotary, diaphragm, or peristaltic pumps.

In one embodiment of the present invention, an animal bathing system uses flow meters to provide sensing for an electronic control system governing pump speed and/or for calculating and displaying mixing ratios.

In one embodiment of the present invention, an animal bathing system can be electronically controlled.

Other features of embodiments of the present invention will be apparent from the accompanying drawings and from the detailed description that follows.

Figure 4:
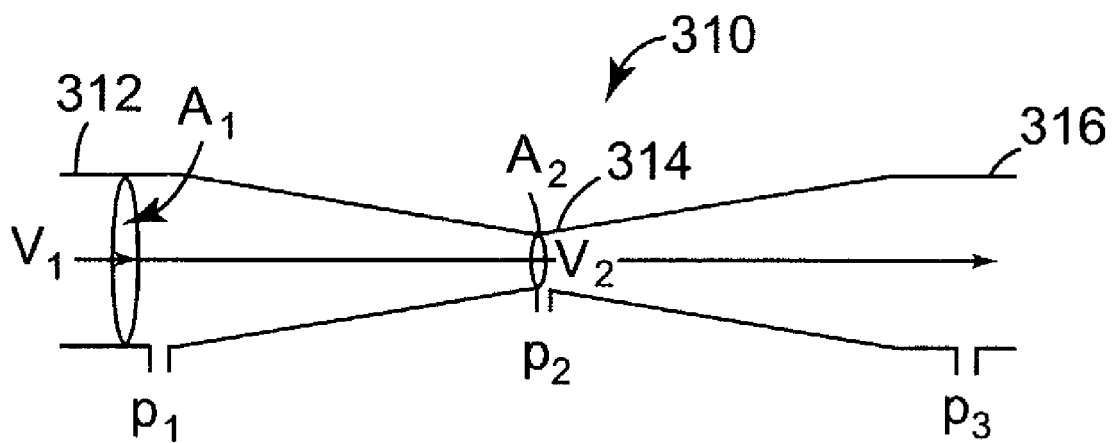

FIG. 4 schematically depicts the differential pressure injector and the principle of its operation in accordance with embodiments of the present invention.

Figure 5:
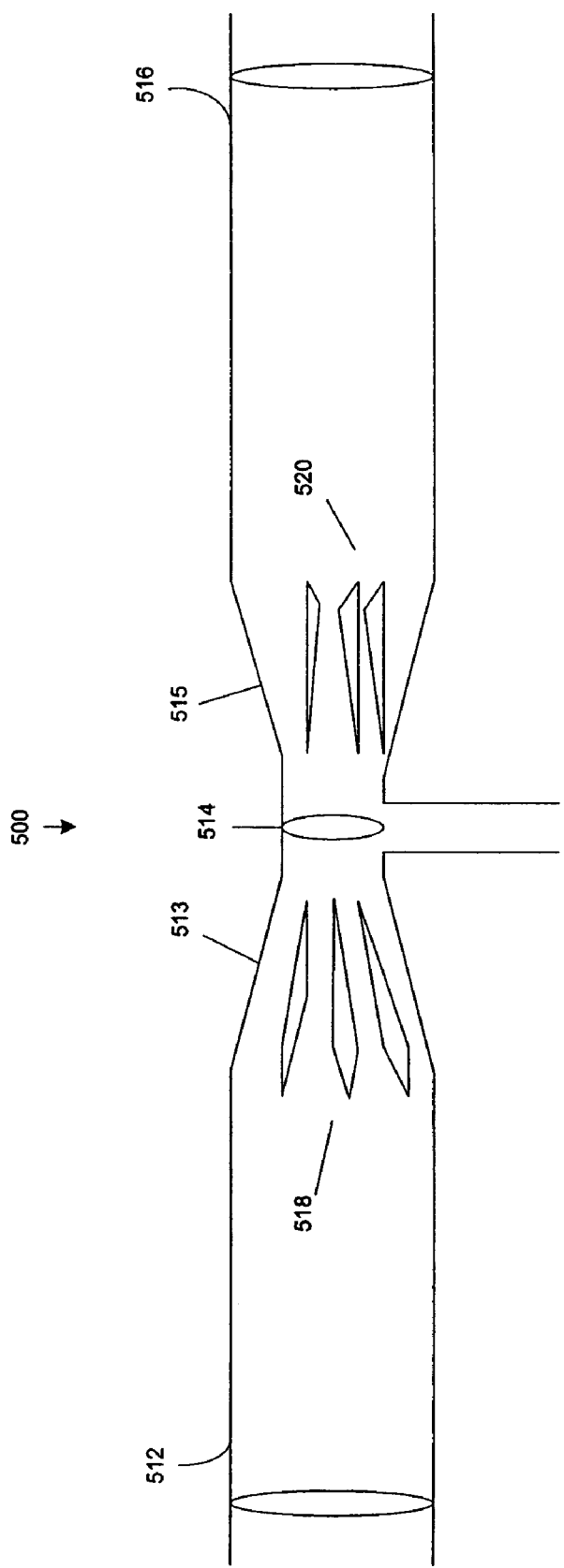

FIG. 5 depicts a cross-section of a differential pressure injector in accordance with embodiments of the present invention.

DETAILED DESCRIPTION OF SPECIFIC EMBODIMENTS

The preferred embodiment of the present invention uses an industrial differential pressure injector of the Bernoulli type (often called a venturi or siphon mixer) to create a vacuum upon various sources of shampoo and conditioner products (injectants) so to draw from storage bottles and aggressively mix the products with the water (motive liquid) inducing the vacuum. The resulting mixture is dispensed directly upon an animal to be bathed. An injector bypass valve allows rinse water to be dispensed.

Figure 1:
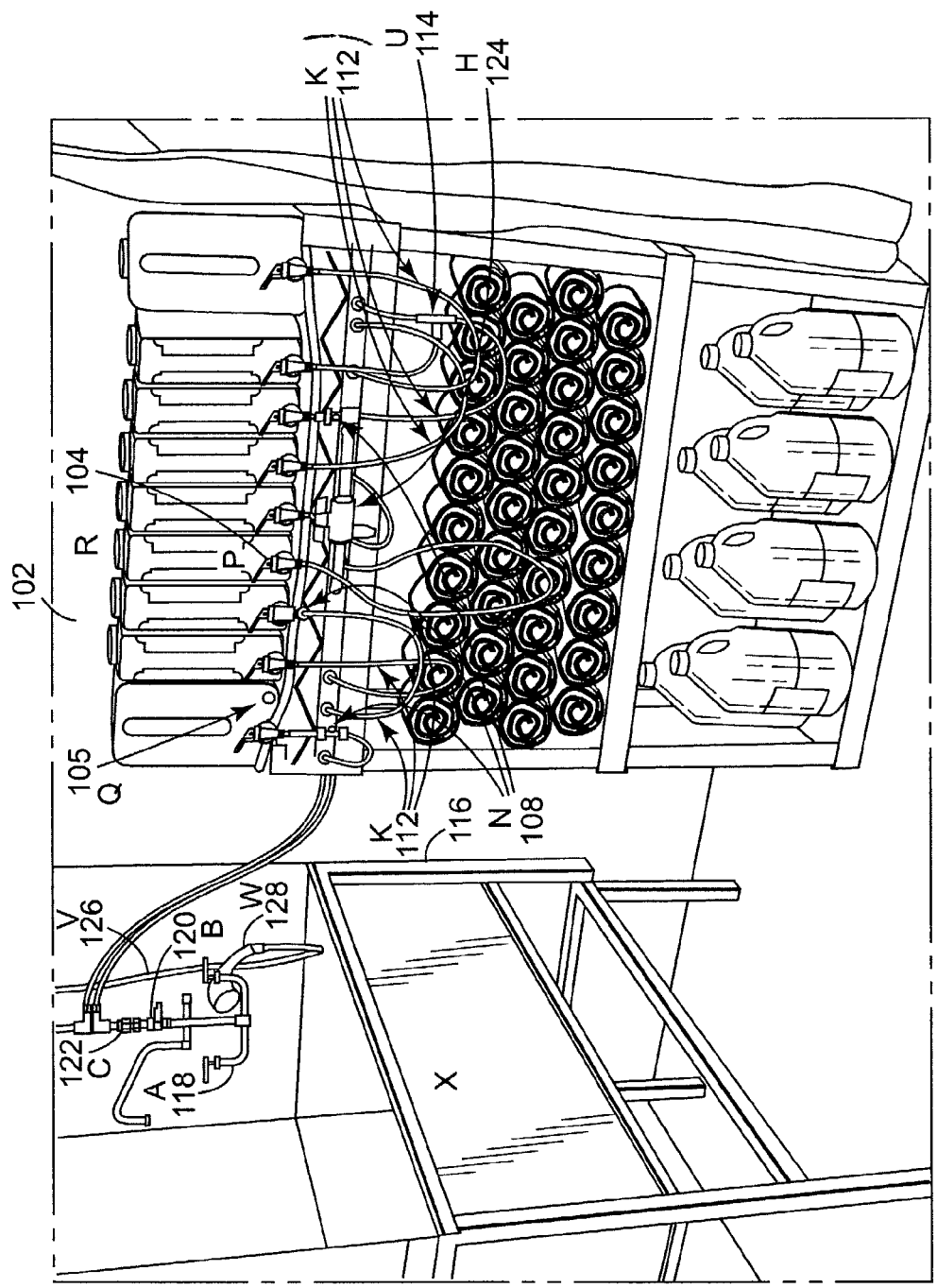
FIG. 1 depicts an animal bathing system constructed in accordance with an embodiment of the present invention.

FIG. 1 shows a bathing system integrated into the topmost (called a "wedge" or "blender shelf", in which the various plumbing components are mounted) of three shelves configured as a set of free-standing shelving. Dispensers (e.g., nine injectant dispensing bottles 102) holding various shampoos and conditioners (injectants) are supported near eye level, each having its own Injectant On/Off Control Valve 104 attached to and integrated with the bottle. Inside the leftmost bottle, an internal re-circulating pump 106 can be seen. Some of the bottles 102 are shown with optional needle valves 108 installed in-line with flexible tubing 112 and having integrated quick disconnects 110 (see also FIG. 2(*b*)). Flexible tubing 112 connects the bottles to the plumbing contained within the top shelf "wedge." A plumbing "T" 114 is used in one case to allow expansion of capacity of the distribution manifold (not shown, located within the "wedge") from 8 to 9 bottles. Integrated into tub 116 are hot and cold water supply valves 118, providing the water source to which the bathing system is plumbed through a water flow valve 120 and anti-siphon, backflow prevention check valve 122. A pair of flexible hoses 130 convey water to the "wedge" from the tub location 116 and back to the tub location 116 from the "wedge." Rinse water or injectant/water mix, as selected by Injector Bypass Valve 124, is supplied to the tub 116 location, via one of the flexible hoses of the pair of flexible hoses 130 and then to a flexible hose 126 and a specially manufactured hand-held shower spray head 128. The spray head 128 incorporates a set of water driven mechanics that induce a pulsating action to both the water/injectant stream and rinse water. The remaining two shelves (below the "wedge") provide miscellaneous storage space or space for additional bottle subassemblies.

More than one "wedge" can be stacked into the shelving unit. This allows, for example, one set of shelving to support two tubs positioned side-by-side with independent bathing systems. Such shelving would support two "wedges" (plus up to two shelves for miscellaneous use), each supporting its respective set of bottle assemblies and supporting plumbing to each tub. In this fashion, each tub and connected bathing system would operate independent of the other, but take up no additional floor space than required by just one system. The two "wedges" could face the same or opposite directions, whichever configuration best fits the adjacent side-by-side tub arrangement.

Figure 2A:
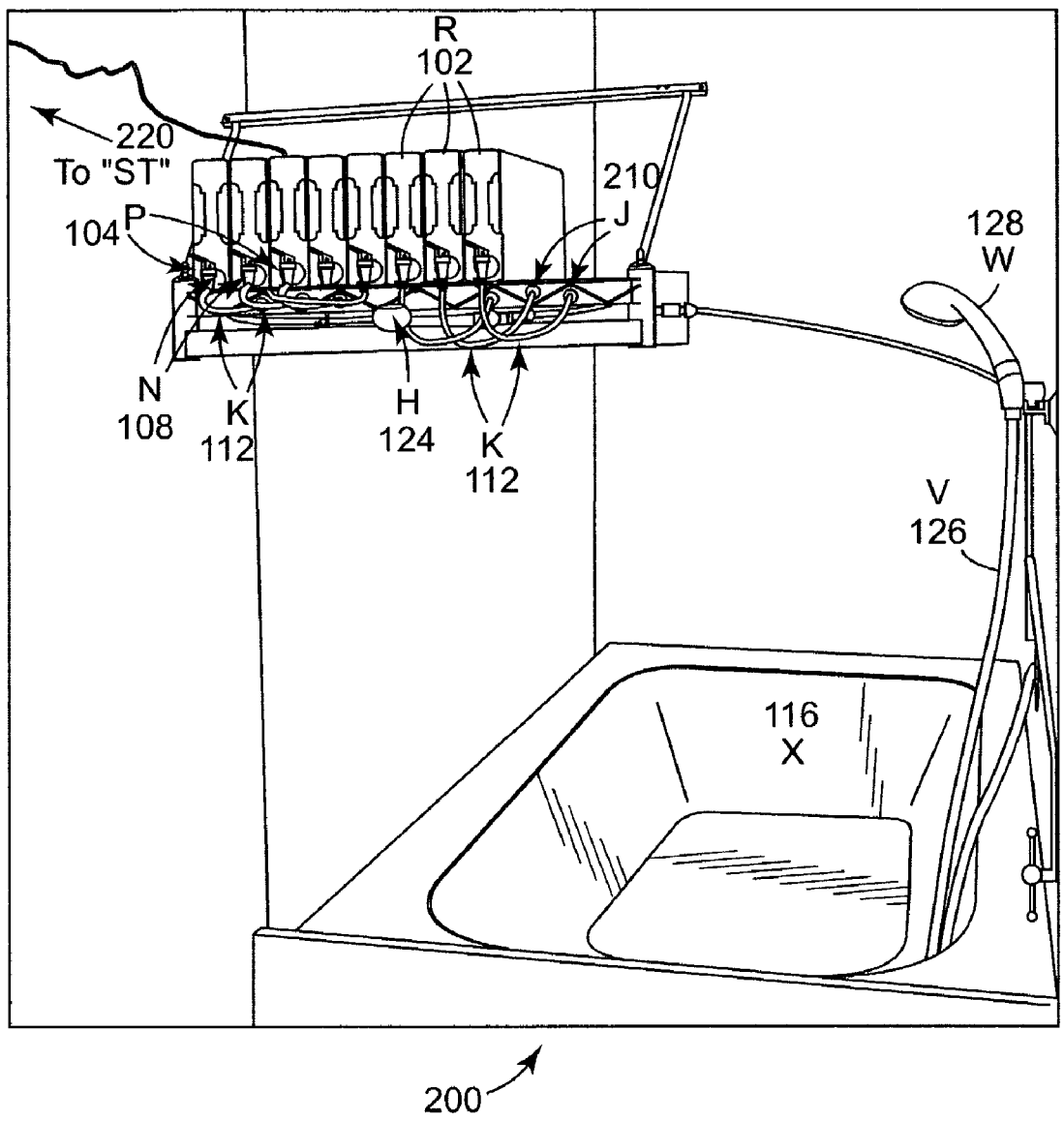
FIG. 2(a) depicts an animal bathing system constructed in accordance with an embodiment of the present invention.
Figure 2B:
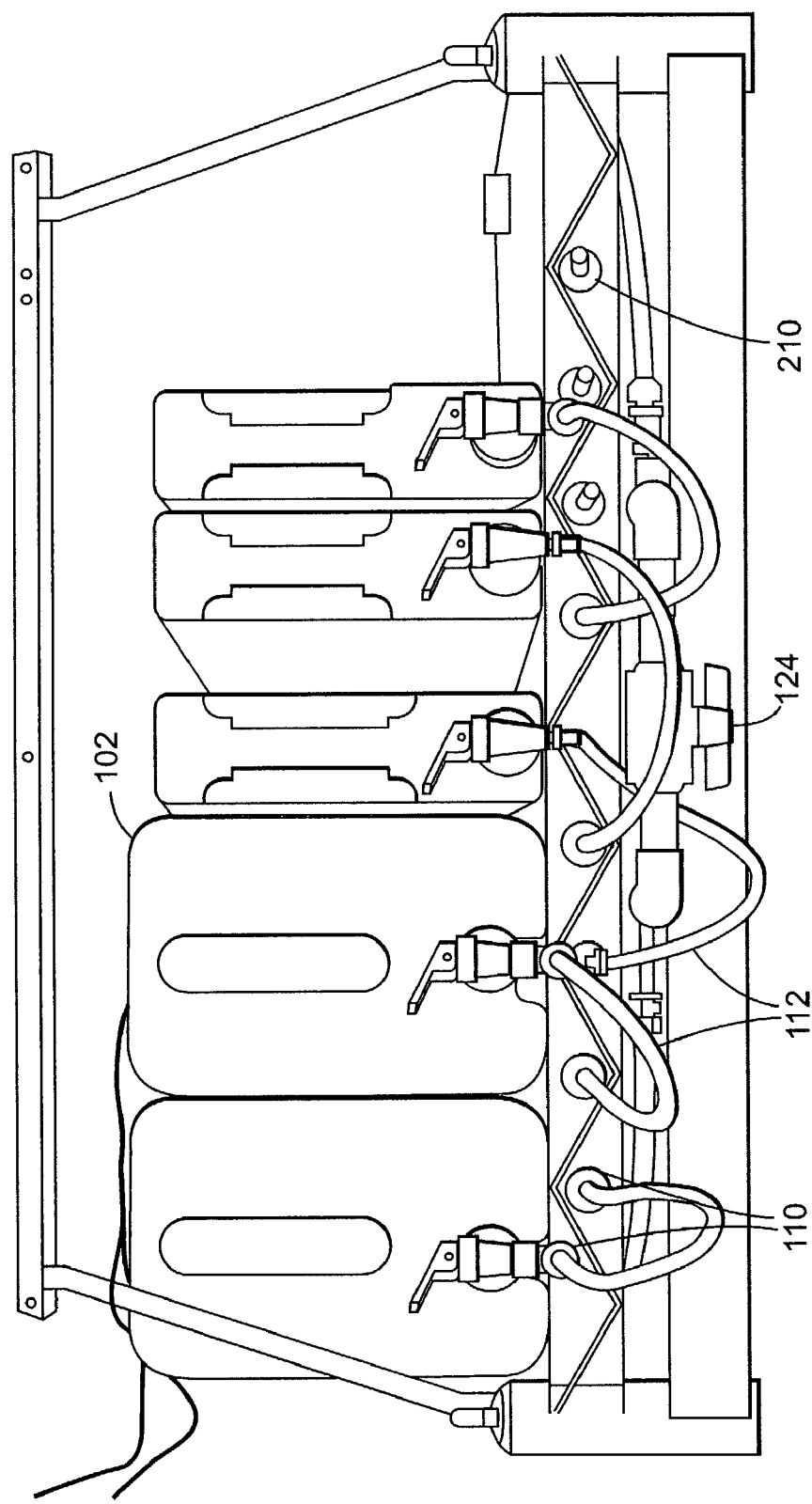
FIG. 2(c) shows an injectant re-circulation pump, step-down transformer supplying power to the re-circulating pump and injectant dispenser in which the re-circulating pump can be used according to one aspect of the invention.
Figure 2C:
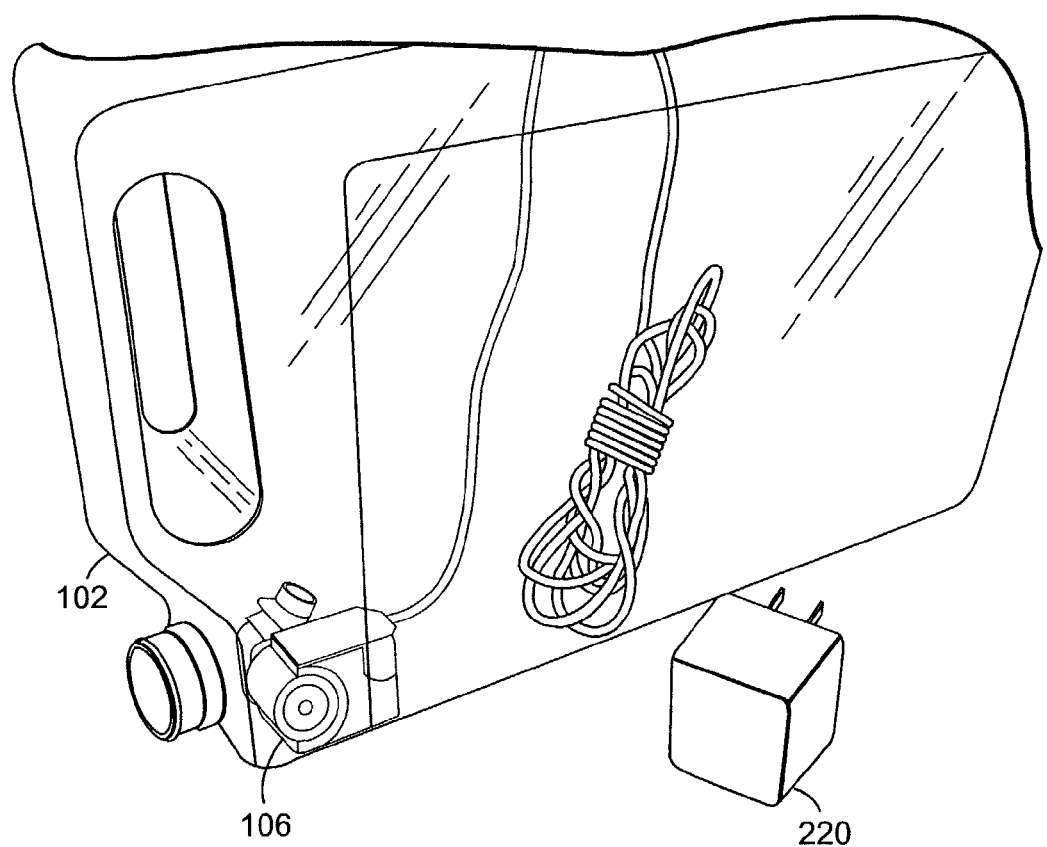

FIGS. 2(*a*) and 2(*b*), which illustrates the injectant dispensing system in FIG. 2(*a*) in greater detail, show a bathing system installed via an optional wall mount kit. Wall mounting offers the benefit of locating the entire bathing system, including injectant dispensing bottles 102, off the floor where limited floor space would otherwise not permit usage. As can be seen from FIG. 2(*a*), access to the system plumbing contained within the "wedge" is available from either side of the "wedge" (compare to FIG. 1, which illustrates access from the left side). This particular bathing system incorporates quick disconnects 210 into the "wedge" for easy connection of individual bottle subassemblies. The leftmost two bottles have optional injectant re-circulating pumps 106, which are not visible in FIG. 2(*a*) except for the electrical power wires leading to their respective step-down transformers (220, out of the picture). Examples of a re-circulating pump 106, step-down transformer 220, and injectant dispensing bottle 102 are shown in FIG. 2(*c*).

Aside from free-standing and wall mount, and injectant mixing, dispensing and rinsing functions, the animal bathing system is designed to support five operating modes, all of which are illustrated in the system schematic block diagram (FIGS. 3(*a*) and 3(*b*)). The first of these is passive, requiring only water flow (pressure from the source of water) to power the entire system (no electrical power required) via an industrial differential pressure injector of the Bernoulli type 310, which functions as both an injector and mixer. As will be described in more detail below, a low-pressure injector design that achieves aggressive mixing of water and injectant has been utilized in a preferred embodiment of the invention. The second operating mode involves electrically powered pumps 106 to re-circulate the product in the injectant bottles 102 to maintain consistent injectant mixture. The third and fourth modes augment passive operation of the bathing system where concentrated shampoo or conditioner injectant products are so viscous and sticky that the vacuum induced by injector 310 is inadequate to cause a sufficient quantity of the concentrated product to be injected into the water stream. The fifth mode recaptures fully diluted product from the tub and after filtering (by a re-circulation filter 320), and powered by a re-circulating pump 330, returning such for reuse via check valve pair 340. The operation of each operating mode will be described via the block diagram. In all cases, reference will be made to a bottle subassembly, which in the preferred embodiment incorporates items 112, 110, 326, 108, 104, 105, 102, 106 and 220, as appropriate. An injectant re-circulating pump subassembly refers to the combination of a pump 106 and its powering isolation transformer 220.

All operating modes involve automatic mixing of water and shampoo or conditioner injectants, resulting in an appropriate mixture being dispensed onto the coat of the animal to be bathed. They also allow rinse water to be dispensed onto the animal's coat. Hot and cold water sources are regulated via independent valves or an optional thermostatic mixing valve to control the temperature of the overall mixture to be applied to the animal. A separate tepid water flow control valve 120 is preferred (where such functionality is not incorporated into a thermostatic mixing valve) in order to control water flow independent of temperature. Different size animals (e.g., cats versus dogs) and parts of animals (e.g., faces) require reduced water flow and pressure imposed on the animal during bathing. The invention incorporates a water flow control valve on its input. Locating the valve upstream from the mixer minimizes deviation from the desired product/water mixture ratio as a function of desired mixture flow rate. An anti siphon (backflow preventing) check valve 122 prevents the water/injectant mixture from flowing back into the water supply lines (and thus contaminating such) in the event of a sudden drop in water source pressure. A water source filter 302 traps large particulates in the water source, preventing such from contaminating the balance of the bathing system.

Some jurisdictions require bathing systems of any kind to restrict water flow (most often constraining water flow to less than or equal to 2.5 gallons per minute (gpm)) in order to comply with water conservation regulations. The bathing system according to one embodiment of the present invention provides for use of an orifice implementing a flow restrictor 303 to accommodate such regulatory requirements. As an example, a water flow rate of about 4.0 gpm or lower (as low as 1.4 to 1.25 gpm) while maintaining the desired mixture ratio can be achieved with the bathing system according to one embodiment of the invention. Certain choices for a differential pressure injector 310 can impose adequate natural flow restriction, in which case an alternate location for a flow restrictor is shown in parallel to the differential pressure injector 310. The differential pressure injector 310 operates on the Bernoulli principle (see FIG. 4).

By Bernoulli's equation for steady, nonviscous, incompressible flow, a vacuum is created at the injectant port 314 ($p_2$) based upon the input pressure ($p_1$) at the primary inlet 312 and the difference of the square of the velocities ($v_1$ and $v_2$), which is a function of the areas $A_1$ and $A_2$, a steady state source of fluid under pressure, and the fluid density ($\rho$). Strict applicability of this simple equation depends upon several factors, including that $p_1$ is on the order of 10 times or greater than $p_3$, the pressure at the outlet 316. When that condition is not met, the vacuum at the injection point ordinarily diminishes precipitously. Therefore, it is beneficial that back pressure seen by the differential pressure injector 310 be minimized to assure consistent performance. This is not a trivial undertaking. The mixing ratio of injectant to motive fluid depends also on the difference in density, specific gravity, viscosity and stickiness of the two fluids (motive and injectant). As will be shown in more detail below, injector design can dramatically affect operating efficacy beyond the very simple operating principles described in FIG. 4. While the pressure relationship at lower $p_1$ to $p_3$ ratios generally follows the trend suggested by the simple form of Bernoulli's equation, judicious design of the injector can result in adequate vacuum at the injection point.

Opening Injector Bypass valve 124 (also shown in FIG. 2(b)) reduces the pressure differential to zero ($p1=p2=p3$), caused by $v2=v1=0$, which, by Bernoulli's equation, results in reduction of injectant flow to zero. Therefore, water effectively bypasses the injector 310 resulting in no injectant being introduced into the water stream. This gives rise to a rinsing function, whereas shampooing or conditioning functionality occurs with valve 124 closed.

As an example of alternatives to the bypass path that includes the injector bypass valve 124, a simple shutoff valve (not shown) may be placed between the distribution manifold 318 and the injector 310. Alternatively, injectants can be shut off by injectant on/off valves 104 in the individual injectant supply lines.

Output of the injector 310 includes both the injectant and motive water flow where the mixture ratio of water to injectant depends upon the many variables discussed above. In the case of an open Injector Bypass Valve 124, only water exits the assembly. This outflow is introduced into a hose 126 connected to a hand-held shower spray unit 128. This latter unit employs water (and injectant) flow to induce rotary action through a series of gearing that rapidly and repetitively shuts off and turns back on the water flow, giving rise to a pulsating water flow action. This pulsating action provides a "water/shampoo/conditioner" massage action to the animal being bathed. This function operates independent of the product being dispensed, or water alone during rinse operation. Some existing bathing systems (those powered by a liquid re-circulating pump) produce a pulsating water/shampoo mixture flow, an unintentional operating characteristic of many fluidic pump types. Such pulsating action has proven valuable in loosening hair mats during animal bathing. Employing pulsating action during rinsing operations greatly facilitates rinsing injectant residue from the skin and hair.

The balance of maintaining a relatively constant mixture ratio of water to injectant over a highly variable flow rate (due to source water pressure, source supply line size, and the degree valves 118 and 120 may be open or closed) and back pressure imposed by hose 126 and spray unit 128 is a delicate one. The preferred embodiment of the present invention utilizes a low pressure injector design, such as that used in the Mazzei Model #384 (identified by the manufacturer as being covered by U.S. Pat. Nos. 4,123,800 and 5,863,128, which are hereby incorporated by reference), to (a) maximize consistency of dispensed water to injectant mixture (within about 50% variation in water-to-injectant ratio, i.e., ±25% relative to the mid-point of the mixing ratio range, and more preferably approximately 13.4:1±13% for injectant density, specific gravity, viscosity and stickiness equal to that for the motive water flow) over a wide range of water flow rates and pressure; (b) maximize the aggressiveness (thoroughness) in mixing injectant with motive water, to make the most efficient use of the injectant, without need to introduce air or other mixing/agitation agents; and (c) to minimize the minimum motive dynamic water pressure required to operate the system (i.e., to inject desired amount of injectant into the motive water) without pressure-increasing water pumps (with the acceptable pressure at the injector inlet at the lower end of pressure range in common residential and commercial water supplies, e.g., 40, 30 or even as low as 20 psi).

The injector has a constricting portion, a cylindrical injection portion, and an expanding portion in that order in the direction of flow, with an injector port entering the injection portion. The twisting vanes are formed on the wall of the constricting portion, and straightening vanes are formed on the wall of the expanding portion. The twisting vanes give a rotary component of motion to an outer portion of the water stream in the injection portion, and the straightening vanes remove at least some of it in the expanding portion, both to cause more vigorous movement of water and injectant, and improved mixing of the two.

This operation depends greatly upon the spray unit 128 employed. Best performance has been obtained with a manufacturer-modified version of a commercial shower spray head (Alsons commercial model #465) minimizing back pressure induced by the spray head to not more than 10 psi, or more preferably 7 psi, with injector inlet pressure of 20 psi or flow rate of 1.4 gpm. A flow-rate-restricting orifice was removed from the commercial version of the spray head to achieve the low back pressure. This combination has produced the cited mixing consistency over a dynamic water pressure, measured at the motive flow inlet to the injector, ranging from a low of 20 psi (delivering approximately 1.4 gpm) to over 80 psi (delivering approximately 2.6 gpm at 80 psi). Those skilled in the art will recognize that other injector/spray units may be used in a manner consistent with the teachings of this invention.

A cross-section of an exemplary differential pressure injector 500 is illustrated in FIG. 5. In the present example, the differential pressure injector 500 defines a flow passage from the primary inlet 512 to the outlet 516. The flow passage is defined by a circularly sectioned wall extending along a central axis from the primary inlet 512 to the outlet 516. The wall forms a substantially cylindrical entry portion, a constricting portion 513, a substantially cylindrical injection portion 514 and an expanding portion 515. The constricting portion interconnects the entry portion and the injection portion 514, and is substantially frusto-conical. The expanding portion 515 joining to the injection portion 514, and is substantially frusto-conical. The injector port enters the injection portion 514 from the injectant inlet through the wall immediately adjacent to the intersection of the constricting portion 513 and injection portion 514.

The injector further comprises a system of vanes, including a first group of twisting vanes 518 and a second group of straightening vanes 520, on the wall and angularly spaced apart from one another. The first group of twisting vanes 518 is positioned substantially in the entry portion of the injector 500, and the second group of straightening vanes 520 is positioned substantially in the expansion portion 515 of the injector 500. In one embodiment, the first group of twisting vanes rise from the wall and have a crest forming an acute angle with a plane that includes the central axis and which passes through the first group of twisting vanes 518. The crest is radially spaced from the central axis. The second group of straightening vanes 520 are angularly spaced apart from one another. Each of the straightening vanes extend along the wall in the expanding portion 515 of the injector 500. The straightening vanes are parallel to the central axis and have a crest substantially parallel to and radially spaced from the central axis of the injector 500.

In one embodiment, the invention employs a distribution manifold 318 connecting the outputs of a multitude of bottle subassemblies (each handling a separate shampoo or conditioner product) to injector 310 through check valve 322.

In one embodiment, the invention incorporates a separate injectant on/off control valve 104 for each container 102 of product (injectant) to be dispensed. Each injectant on/off control valve 104 may be independently actuated. This allows more than one shampoo or conditioner product to be introduced at once into the injector-mixer at a time. By example, a deodorizing shampoo, such as those typically used for eliminating skunk odor, can be automatically mixed with another shampoo in order to reduce odor accumulation near the rear end of a dog during anal (scent) gland elimination (a common bathing practice). Shampooing of the entire animal for that purpose would not be warranted under these conditions. Rarely does a bather manually apply a deodorizing shampoo in addition to ordinary shampoo before or after scent gland elimination. Even more rarely does a professional bather/groomer pre-mix deodorizing shampoos and ordinary shampoos anticipating such a need. Another example could include automatic mixing of moisturizing and oatmeal conditioners so to simultaneously treat dry skin and itch. This bathing system can accommodate dispensing a theoretical unlimited number of products either independently, or automatically mixed together, depending on which injectant on/off control valves 104 are open.

Non-opaque storage bottles 102, (e.g., transparent bottles) are used to contain injectants such as shampoos and conditioner products. When the injectant on/off control valve 104 is incorporated into each bottle, the configuration allows the user to simultaneously see the actual product to be dispensed (e.g., eliminating uncertainty as to what product an actuating valve, or valve position, might dispense) and to ascertain that adequate product is available for dispensing (i.e., is the bottle adequately full instead of near empty).

In FIGS. 3(*a*) and 3(*b*), a 35 US Mesh filter 105 is employed to prevent particles larger than 500 microns from being introduced into the differential injector injectant port, possibly blocking such.

Embodiments of the present invention are designed to accommodate the vast majority of over 500 animal shampoo and conditioner products on the market. Some of these products are so thick, viscous, and sticky in concentrated form that some pre-dilution, within storage bottle 102, is required in order to permit the passive operating mode to work. Some products require more dilution (e.g., 35:1) than the nominal 13:1 automated by the system, also requiring pre-dilution of product introduced into injectant storage bottles 102. A few products are very thin and runny and/or require final mixture ratios less than the nominal 13:1 provided by automated passive system operation. It should be noted that one benefit of various embodiments of the invention is that the aggressive mixing by the injector results in much more economical use of the injectants than typically achieved in conventional bathing. Thus higher mixing ratios than those recommended by the injectant manufactures-manufacturers can be used. Although the ratio 13:1 has been used herein as an example, other, higher ratios can be achieved and satisfactorily used for animal bathing. An optional needle valve 108 is available for each bottle subassembly in order to help accommodate user needs in dealing with the vast array of product properties, desired mixture ratios, and pre-dilution options. Users control the desired mixture ratio first by controlling the pre-dilution of the product in dispensing bottles 102. Users are instructed to adjust pre-dilution as necessary to assure passive system operation. Then, the optional needle valves 108 are available to provide another means to control the ultimate mixture ratio independent of the pre-dilution that may be required to assure passive operation.

Quick disconnects (110 and 210) and a flexible connecting hose 112 allow the user to easily remove a bottle subassembly from its shelf for cleaning or for refilling. The flexible hose 112 also allows use of simple plumbing "Ts" to expand the system to accommodate more products than the system is nominally designed to accommodate, as may be limited by the number of ports built into the distribution manifold 318 or front panel real estate practicably limiting the number of bulkhead quick disconnects 210. In this fashion, the system can handle nearly an unlimited number of products to be dispensed. As a practical limit, each shelf is designed to accommodate up to 11 different bottle subassemblies, and hence products. A free standing system of three shelves, therefore, could easily handle 33 different products, each contained in a separate bottle subassembly, yet with only 6 to 8 manifold ports and bulkhead quick disconnects 210.

Operating Mode 2: Motorized Mixing of Pre-mixed Shampoo.

Two issues surround dealing with pre-mixing of shampoo and conditioner concentrates. The first is the labor required to measure product and water into a single container and vigorous shaking of such container to evenly mix the ingredients. The second, far lesser known issue is that many of the >500 shampoo and conditioner products will not go into and stay in solution when diluted. Therefore, product constituents tend to precipitate or separate, creating product stratification within the container otherwise believed to contain evenly distributed solute. In one embodiment, the present invention introduces an optional agitator, such as an electric motorized pump 106, to continuously re-circulate ingredients in each injectant dispensing bottle 102, as desired or necessary. While this feature doesn't affect measurement of ingredients introduced into a particular bottle, it does eliminate any need to shake such bottle to mix the ingredients. Therefore, product and water can be measured directly into a pump-equipped dispensing bottle 102. No subsequent manual agitation is required. More importantly, this functionality assures proper mixture (dilution) of the ingredients dispensed to the injector, independent of the amount of product contained in the injectant dispensing bottle 102. Best results have been found employing a small submersible pump 106 manufactured by TGI of China and designed for continuous operation. The pump 106 is permanently cemented into the inside bottom of the injectant dispensing bottle 102 using an adhesive compatible with the bottle and pump motor body materials, and compatible with total immersion in water plus shampoo and conditioner products. As an added safety benefit, the pump 106 operates on 24 VAC, allowing some distance to be maintained between line voltage (120 VAC) and the bathing system plumbing. A step down isolation transformer 220 remotely provides the 24 VAC power from the line voltage. Although not shown, a single transformer capable of providing adequate current could power multiple pump-equipped bottles, eliminating the need for numerous separate transformers.

Other types of agitators can also be used for ensuring proper mixing of water and injectant in a dispensing bottle 102. As an example, a motor-driven mixing paddle or blade can be placed inside the dispensing bottle 102, with the motor located outside the bottle 102. As another example, a magnetic stirrer can be used. A magnetic stirrer includes a stirring bar comprising of a magnet that can also be sealed inside a coating of an inert material such as Teflon®, and a stirring bar driver, which produces a rotating magnetic field. The stirring bar can be placed inside the dispensing bottle 102, and the stirring bar driver outside the dispensing bottle 102. The stirring bar is set in motion by the magnetic field produced by the driver, thereby mixing the injectant in the dispensing bottle 102. For injectants that require stirring with more powerful re-circulation pumps, pumps located outside the dispensing bottles 102 can be used, with inlet and outlet hoses extending to, or into, the dispensing bottles 102. Ultrasonic agitation (e.g., placing an injectant dispenser under the influence of an ultrasonic acoustic emitter) can also be used.

Operating Mode 3: Fluidic Pump Assistance.

Some users may wish not to pre-dilute their products, preferring instead to use only concentrated shampoo and conditioners with the bathing system. As previously indicated, specific gravity, density, viscosity and stickiness properties of certain concentrates may preclude passive operation. An optional motorized pump 324 can overcome these adverse concentrate properties. Concentrate only is introduced into each bottle 102. Pumps 324 could operate continuously, or preferably be switched on and off in concert with injectant on/off valve 104. Alternatively, a pump 324 incorporating an electrically driven valve can eliminate any need for the separate manually operated on/off injectant valve 104. The hydraulic pressure (and suction) induced by pump 324 overcomes product physical properties and provides a pressure assistance to the function of the differential pressure injector 310. Regulation of concentrate flow (and ultimate dispensed product mixture ratio) is accomplished through sizing pump 324, electrically controlled variable pump speed, and/or use of an optional needle valve 108, or more preferably a pressure regulator (not shown).

Figure 3A:
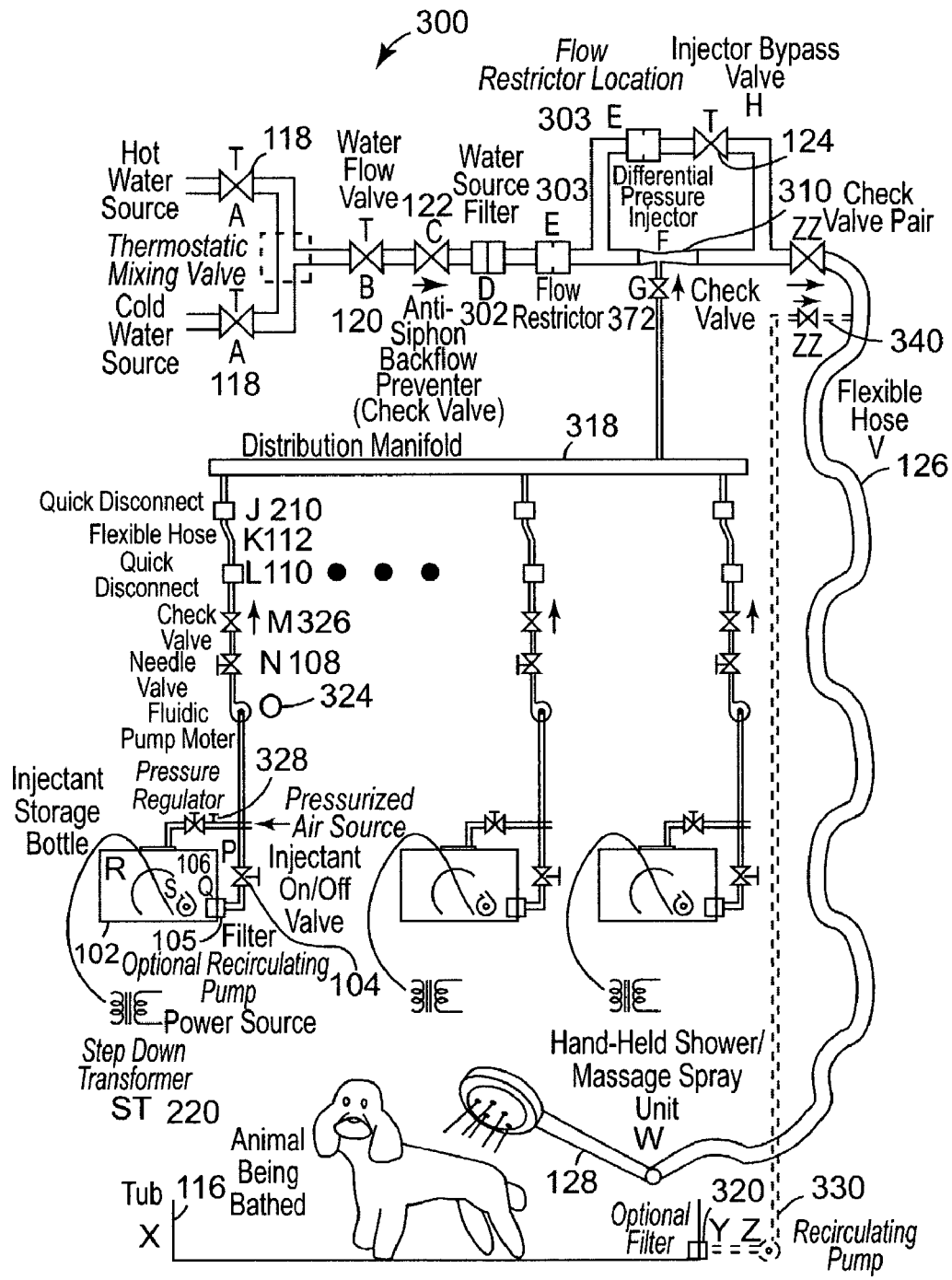
FIG. 3(a) is a simplified schematic block diagram depicting an embodiment of the present invention.
Figure 3B:
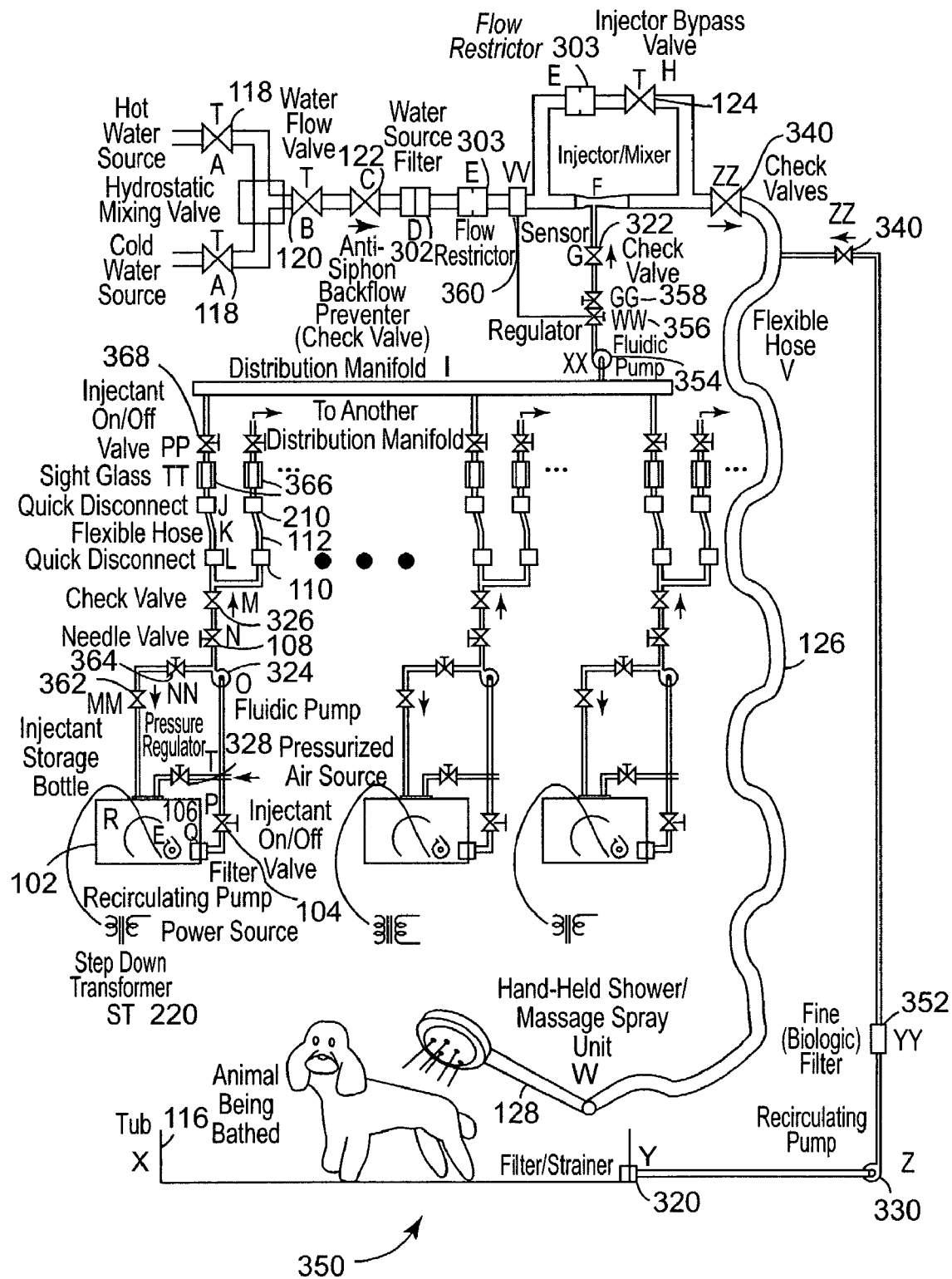
FIG. 3(b) is a schematic block diagram depicting another embodiment of the present invention.

As illustrated in FIG. 3(b), check valves 362 can be used to prevent the injector 310 from pulling air from the top of the dispensing bottles 102; and valves 364 can be used at individual dispensing bottles 102 to control the amount of injectant re-circulated via pumps 324 through dispensing bottles 102, both to maintain injectant uniformity and to prevent zero flow "dead head" conditions that can be detrimental to pumps 324 when operated with injectant on/off valves 368 closed. Thus, pump 324 can be used to both aid the injectant flow to the injector 310 and re-circulate the injectant in the bottle. Check valve 362, which may alternatively be located up or downstream in a bottle subassembly from that illustrated in FIG. 3(b), precludes cross contamination between bottle subassemblies due to different injectant pressures introduced into manifold 318.

A variety of pumps can be used in this application, including linear pumps (commonly used for carbonated beverage syrup pressurization and delivery in vending machines), peristaltic, and other types.

The bathing system can be further extended to total automatic, electronic control. This is discussed below.

Operating Mode 4: Air Pressure Assistance.

An alternative can achieve many of the same attributes of Operating Mode 3, above. Air pressure can be introduced into the top of dispensing bottle 102, providing hydrostatic pressure to the contained injectant, in lieu of a fluidic motor 324. This alternative offers the advantage of potentially lower cost if a large number of bottle subassemblies demand pressure augmentation. A single source of air pressure can be shared across all bottle subassemblies (even multiple bathing systems). A separate pressure regulator 328 is preferred for each bottle subassembly, so to control mixture ratio for each product. Check valve 362 is still needed for the same reasons described above.

Operating Mode 5: Re-Circulating Totally Mixed Product.

In one embodiment, the invention accommodates optional re-circulating action via incorporating a re-circulating pump 330 outside the tub 116 and check valve pair 340. Re-circulating pump 330 speed can also be controlled. This operating mode allows otherwise passive or active operation of the remaining portions of the bathing system to initially dispense product on the animal, effectively retaining fully mixed product in the tub. Once adequate product is available in the tub (116; less than required for operation of a sump pump), re-circulating motor 330 can take over and re-circulate that product. This provides shampoo/conditioner product savings. Indeed, both non-re-circulating and re-circulating operation can be simultaneously achieved, compensating for the amount of product adhering to the animal being bathed and not running off into the tub 116.

The re-circulation filter 320 can be located at the tub 116, as shown in FIG. 3(a), or any other location along the re-circulation path between the tub 116 and the spray unit 128. The optional filter 320 preferably has appropriate porosity to trap at least a large proportion of the debris (e.g., dirt, animal hair, skin cell, dander and parasites) washed away from the animal in the bathing process but pass through most injectants mixed in the bathing water.

A more detailed diagram of an embodiment of the invention is schematically illustrated in FIG. 3(b). The bathing system 350 is similar to the simplified schematic block diagram illustrated in FIG. 3(a), but supports additional injectant lines, at least one additional distribution manifold (not shown) and at least one additional injector (not shown) so that the same bank of stored injectants can be used to supply one or more additional washing stations. Additional features include separate filters 320 and 352 in the re-circulating line, with a coarse filter 320 positioned upstream from the pump 330 to trap large particles in order to protect the pump 330. A fine, biologic filter 352 has a effective mesh size of under 100 microns to as small as about a micron and is designed to pass most injectant constituents, but not biologic materials such as skin cells, dander and bacteria. Filter 352 can also include a disinfecting unit, employing heat, UV radiation or other means to sterilize biological matter not otherwise trapped by the filter 352.

In addition to, or instead of the pumps 324 in FIG. 3(a), the system in FIG. 3(b) can employ a pump 354 for assisting injectant flow toward the injector 310. In conjunction with the pump 354, a regulator 356 with a fixed or variable orifice (such as a needle valve) 358 can be used to further steady the flow rate of injectant and maintain negative pressure at the injectant inlet of the injector 310. A flow rate or water pressure sensor 360 can also be employed to control the regulator 356, thereby controlling the mixing ratio. It is possible to eliminate the differential pressure injector 310 altogether, substituting a non-differential pressure injector (such as a passive mixer fed from two or more mixing pumps) instead. Indeed, flow meters (illustrated in FIG. 3(b)) can be introduced at the water flow and injectant inputs to any suitable mixer (differential pressure or not) to provide sensing for an electronic control system governing speed of pumps 324 and/or 354. This functionality would allow computerized control, and highly consistent maintenance of water/injectant mixture ratios, virtually independent of inlet water pressure and injectant physical properties. Even with this pump augmentation (with or without control system), use of a differential pressure injector (in lieu of any other type design) offers the advantage of using both motorized pump and passive bottle subassemblies in the same bathing system. It should be noted that a sensor-controlled regulator is particularly useful, even necessary in a bathing system where the injector is not of a differential-pressure type. Other components can be included as the performance requires.

Other features of the embodiment shown in FIG. 3(b) include a sight glass 366, which can be as simple as a segment of non-opaque tubing, in each injectant supply line leading to the distribution manifold 318. Such sight glasses enables a user to ascertain the availability and identity of particular injectants to the injector 310 without requiring the dispensing bottles 102 themselves to be non-opaque or visible to the user. Sensors, such as float mechanisms or weighing mechanisms, can be placed at the dispensing bottles 102 to facilitate indication (for example, by warning lights or sounds) of availability (or lack thereof) of injectants in the dispensing bottles 102.

Also included in the embodiment shown in FIG. 3(b) are injectant on/off valves 368 placed along the individual injectant supply lines. These valves allow a user to conveniently select subsets of the available injectants to suit particular tasks.

Automated Operation.

The present invention is described herein with the intent of maintaining a balance between economy of equipment, ease of operation, efficacy and efficiency in mixing and dispensing products, and general reduction in bathing time. A more automated bathing system is also contemplated, potentially increasing ease of use, but at higher equipment cost. In this case, valves 120, 124, and 104 are all electrically controlled. Pumps 324 and 330 incorporate electronically controlled variable speed. Manual (electric) pushbutton controls can even be integrated into the hand held unit 128, providing complete control by one hand, similar to the way a bar beverage dispenser wand operates. Dispense vs. Rinse vs. Re-circulate functions could be selected as well as system on/off. Product dispensing could also be selected. Mixture ratios could be maintained via means discussed above. Mixture flow rates out of the hand-held unit 128 could also be controlled at the hand-held unit (by electrically controlling valve 120 and pump motor 330 speed).

EXAMPLES

1. A bathing system of the invention was tested with a wide range of injector inlet water pressure. Using also water as an injectant, the flow rate and injectant mixing ratio was measured. The results are listed in Table I below.

TABLE I

Flow Rate and Mixing Ratio vs. Inlet Pressure

| Mazzei Model #384 | | With Alson (with massage) | | | | |
|---|---|---|---|---|---|---|
| | | motive flow | | suction (water) | | motive:suction |
| inlet psi | outlet psi | (gpm) | (gph) | (gpm) | (gph) | ratio |
| 80 | 22 | 2.6 | 156 | 0.17 | 10.3 | 15.10:1 |
| 70 | 20 | 2.45 | 147 | 0.17 | 10.2 | 14.40:1 |
| 60 | 17 | 2.28 | 137 | 0.17 | 10.2 | 13.40:1 |
| 50 | 14 | 2.1 | 126 | 0.17 | 10 | 12.60:1 |
| 45 | 13 | 2 | 120 | 0.17 | 10 | 12.00:1 |
| 40 | 12 | 1.9 | 114 | 0.17 | 10 | 11.40:1 |
| 35 | 11 | 1.78 | 107 | 0.16 | 9.5 | 11.30:1 |
| 30 | 10 | 1.65 | 99 | 0.14 | 8.2 | 12.10:1 |
| 25 | 9 | 1.5 | 90 | 0.1 | 6 | 15.00:1 |
| 20 | 7 | 1.4 | 84 | 0.12 | 7.2 | 11.70:1 |
| | | | | | Average = | 13.40:1 |

2. A bathing system of the invention has been tested using a wide variety of animal bathing products, including those listed below. Consistent mixing with water under a wide range of motive water pressures has been achieved.

Bio-Groom's Econo-Groom, Super Blue Plus, Natural Oatmeal, So-Gentle Hypo-Allergenic shampoos & Silk Creme, Natural Oatmeal Anti-Itch Creme Rinses;

Tomlyn's Nova Pearls and Pro-35 shampoos;

Tropiclean's Berry Clean, Neem Citrus, Oatmeal & Tea Tree shampoos;

Nature's Specialties shampoos and conditioners;

Best Shot shampoos and conditioners;

Coat Handler shampoos and conditioners;

Le Pooches products; and

Mensa Product's Veterinary Formula products.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

I claim:

1. A bathing system for projecting a mixture of water and at least one injectant onto an object for washing the object, the system comprising:

(a) a first injectant dispenser configured to store an injectant;

(b) at least one water sprayer having an inlet and outlet;

(c) at least one differential pressure injector having a primary inlet in fluid communication to a water source, an outlet in fluid communication to the inlet of the at least one water sprayer, and an injectant inlet in fluid communication with the first injectant dispenser, whereby the injectant can be introduced into water flowing through the differential pressure injector; and (d) a fluid path bypassing the at least one differential pressure injector and a valve in the bypassing path for regulating passage of fluid through the bypassing path, the at least one water sprayer and the at least one differential pressure injector being configured to maintain a water-to-injectant ratio to within a range of about a 50% variation of a midpoint of a mixing ratio range associated with the injectant when water flow rate is no higher than about 4.0 gallons per minute and varies over a range of 20% of a midpoint of a range associated with the water flow rate.

2. The bathing system of claim 1, wherein the at least one water sprayer and the at least one differential pressure injector being configured to maintain a water-to-injectant ratio to within a range of about a 15% variation of the midpoint of the mixing ratio range associated with the injectant when water flow rate is no higher than about 4.0 gallons per minute and varies over a range of 20% of the midpoint of the range associated wit the water flow rate.

3. The bathing system of claim 1, wherein the at least one water sprayer and the at least one differential pressure injector being configured to maintain a water-to-injectant ratio to within a range of about a 35% variation of the midpoint of the mixing ratio range associated with the injectant water flow rate is no higher than about 4.0 gallons per minute and varies over a range of 60% of the midpoint of the range associated with the water flow rate.

4. The bathing system of claim 2, wherein the at least one water sprayer and the at least one differential pressure injector being configured to maintain a water-to-injectant ratio to within a range of about a 15% variation of the midpoint of the mixing ratio range associated with the injectant when the water flow rate is varied over a range from about 1.9 to about 2.3 gallons per minute.

5. The bathing system of claim 4, wherein the at least one water sprayer and the at least one differential pressure injector being configured to maintain a water-to-injectant ratio to within a range of about a 35% variation of the midpoint of the mixing ratio range associated with the injectant when the water flow rate is varied over a range from about 1.4 to about 2.6 gallons per minute.

6. The bathing system of claim 1, wherein the at least one water sprayer is configured to produce a back pressure of no higher than about half of the water pressure at the inlet of the at least one differential pressure injector.

7. The bathing system of claim 6, wherein the at least one water sprayer is configured to produce a back pressure of no higher than about 10 psi when the flow rate through the at least one water sprayer is 1.4 gallons per minute.

8. The bathing system of claim 1, wherein the first injectant dispenser includes at least a non-opaque portion through which the amount of the injectant stored in the dispenser can be visually inspected from outside.

9. The bathing system of claim 1, farther comprising an indicator showing the availability of the injectant to the at least one differential pressure injector.

10. The bathing system of claim 9, wherein the indicator comprises a non-opaque portion of an injectant passageway in fluid communication with the first injectant dispenser and the injectant inlet of the at least one differential pressure injector.

11. The bathing system of claim 9, further comprising a content indicator providing a signal indicative of the amount of the injectant in the first injectant dispenser.

12. The bathing system of claim 1, further comprising an agitator configured to homogenize the injectant stored in the first injectant dispenser.

13. The bathing system of claim 1, wherein the at least one water sprayer comprises a pulsating-action sprayer.

14. The bathing system of claim 1, wherein the at least one water sprayer comprises a pulsating-action sprayer.

15. The bathing system of claim 14, wherein the at least one water sprayer is configured to produce a pulsating action using the mixture being projected.

16. The bathing system of claim 1, further comprising:
a second injectant dispenser for storing a second injectant; and
a manifold having intake ports in respective fluid communication with the first and second injectant dispensers and an output port in fluid communication with the injectant inlet of the at least one differential pressure injector for supplying the first and second injectants to the at least one differential pressure injector.

17. The bathing system of claim 16, further comprising at least one valve for selecting one or both of the first and second injectants to supply to the at least one differential pressure injector.

18. The bathing system of claim 12, wherein the agitator comprises a submersible re-circulation pump disposed inside the first injectant dispenser.

19. The bathing system of claim 12, wherein the agitator comprises a re-circulation pump located outside the first injectant dispenser.

20. The bathing system of claim 1, further comprising:
an additional water sprayer having an inlet and outlet; and
an additional differential pressure injector having a primary inlet in fluid communication to a water source, an outlet in fluid communication to the inlet of the additional water sprayer, and an injectant inlet in fluid communication with the first injectant dispenser, whereby the injectant in the first injectant dispenser can be introduced into water flowing through both differential pressure injectors and water sprayers.

21. The bathing system of claim 1, wherein the at least one differential pressure injector comprises a passive mixer.

22. The bathing system of claim 1, further comprising a pump for aiding the flow of the injectant to the first differential pressure injector.

23. The bathing system of claim 1, further comprising:
a tub for collecting the water-injectant mixture from the at least one water sprayer; and
a pump configured to re-circulate the collected mixture back to the at least one water sprayer through a re-circulation path.

24. The bathing system of claim 23, further comprising a filter having an effective mesh size of about 100 microns or finer, the filter being placed in the re-circulation path.

25. The bathing system of claim 24, wherein the filter has an effective mesh size of about 50 microns or finer.

26. A bathing system for projecting a mixture of water and at least one injectant onto an object for washing the object, the system comprising:
(a) a first injectant dispenser configured to store an injectant;
(b) at least one water sprayer having an inlet and outlet;
(c) at least one differential pressure injector having a primary inlet in fluid communication to a water source, an outlet in fluid communication to the inlet of the at least one water sprayer, and an injectant inlet in fluid communication with the first injectant dispenser, whereby the injectant can be introduced into the water flowing through the at least one differential pressure injector;
(d) an indicator showing the availability of the injectant to the at least one differential pressure injector; and
(e) a content indicator providing a signal indicative of the amount of the injectant in the first injectant dispenser, the at least one water sprayer and the at least one differential pressure injector being configured to maintain a water-to-injectant ratio to within a range of about a 50% variation of a midpoint of a mixing ratio range associated with the injectant when water flow rate is no higher than about 4.0 gallons per minute and varies over a range of 20% of a midpoint of a range associated with the water flow rate.

27. The bathing system of claim 26, wherein the at least one water sprayer and the at least one differential pressure injector being configured to maintain a water-to-injectant ratio to within a range of about a 15% variation of the midpoint of the mixing ratio range associated with the injectant when water flow rate is no higher than about 4.0 gallons per minute and varies over a range of 20% of the midpoint of the range associated with the water flow rate.

28. The bathing system of claim 26, wherein the at least one water sprayer and the at least one differential pressure injector being configured to maintain a water-to-injectant ratio to within a range of about a 35% variation of the midpoint of the mixing ratio range associated with the injectant water flow rate is no higher than about 4.0 gallons per minute and varies over a range of 60% of the midpoint of the range associated with the water flow rate.

29. The bathing system of claim 27, wherein the at least one water sprayer end the at least one differential pressure injector being configured to maintain a water-to-injectant ratio to within a range of about a 15% variation of the midpoint of the mixing ratio range associated with the injectant when the water flow rate is varied over a range from about 1.9 to about 2.3 gallons per minute.

30. The bathing system of claim 29, wherein the at least one water sprayer and the at least one differential pressure injector being configured to maintain a water-to-injectant ratio to within a range of about a 35% variation of the midpoint of the mixing ratio range associated with the injectant when the water flow rate is varied over a range from about 1.4 to about 2.6 gallons per minute.

31. The bathing system of claim 26, further comprising a fluid path bypassing the at least one differential pressure injector and a valve in the bypassing path for regulating passage of fluid through the bypassing path.

32. The bathing system of claim 26, wherein the at least one water sprayer is configured to produce a back pressure of no higher than about half of the water pressure at the inlet of the at least one differential pressure injector.

33. The bathing system of claim 32, wherein the at least one water sprayer is configured to produce a back pressure of no higher than about 10 psi when the flow rate through the at least one water sprayer is 1.4 gallons per minute.

34. The bathing system of claim 26, wherein the first injectant dispenser includes at least a non-opaque portion through which the amount of the injectant stored in the dispenser can be visually inspected from outside.

35. The bathing system of claim 26, wherein the indicator comprises a non-opaque portion of an injectant passageway in fluid communication with the first injectant dispenser and the injectant inlet of the at least one differential pressure injector.

36. The bathing system of claim 26, further comprising an agitator configured to homogenize the injectant stored in the first injectant dispenser.

37. The bathing system of claim 26, wherein the at least one water sprayer comprises a pulsating-action sprayer.

38. The bathing system of claim 31, wherein the at least one water sprayer comprises a pulsating-action sprayer.

39. The bathing system of claim 38, wherein the at least one water sprayer is configured to produce a pulsating action using the mixture being projected.

40. The bathing system of claim 26, further comprising:
a second injectant dispenser for storing a second injectant; and
a manifold having intake ports in respective fluid communication with the first and second injectant dispensers and an output port in fluid communication with the injectant inlet of the at least one differential pressure injector for supplying the first and second injectants to the at least one differential pressure injector.

41. The bathing system of claim 40, further comprising at least one valve for selecting one or both of the first and second injectants to supply to the at least one differential pressure injector.

42. The bathing system of claim 36, wherein the agitator comprises a submersible re-circulation pump disposed inside the first injectant dispenser.

43. The bathing system of claim 36, wherein the agitator comprises a re-circulation pump located outside the first injectant dispenser.

44. The bathing system of claim 26, further comprising:
an additional water sprayer having an inlet and outlet; and
an additional differential pressure injector having a primary inlet in fluid communication to a water source, an outlet in fluid communication to the inlet of the additional water sprayer, and an injectant inlet in fluid communication with the first injectant dispenser, whereby the injectant in the first injectant dispenser can be introduced into water flowing through both differential pressure injectors and water sprayers.

45. The bathing system of claim 26, wherein the at least one differential pressure injector comprises a passive mixer.

46. The bathing system of claim 26, further comprising a pump for aiding the flow of the injectant to the at least one differential pressure injector.

47. The bathing system of claim 26, further comprising:
a tub for collecting the water-injectant mixture from the at least one water sprayer and
a pump configured to re-circulate the collected mixture back to the at least one water sprayer through a re-circulation path.

48. The bathing system of claim 47, further comprising a filter having an effective mesh size of about 100 microns or finer, the filter being placed in the re-circulation path.

49. The bathing system of claim 48, wherein the filter has an effective mesh size of about 50 microns or finer.

50. A bathing system for projecting a mixture of water and at least one injectant onto an object for washing the object the system comprising:
(a) a first injectant dispenser configured to store an injectant
(b) at least one water sprayer having an inlet and outlet;
(c) an agitator configured to homogenize the injectant stored in the first injectant dispenser; and
(d) at least one differential pressure injector having a primary inlet in fluid communication to a water source, an outlet in fluid communication to the inlet of the at least one water sprayer, and an injectant inlet in fluid communication with the first injectant dispenser, whereby the injectant can be introduced into water flowing through the at least one differential pressure injector, the at least one water sprayer and the at least one differential pressure injector being configured to maintain a water-to-injectant ratio to within a range of about a 50% variation of a midpoint of a mixing ratio range associated with the injectant when water flow rate is no higher than about 4.0 gallons per minute and varies over a range of 20% of a midpoint of a range associated with the water flow rate.

51. The bathing system of claim 50, wherein the at least one water sprayer and the at least one differential pressure injector being configured to maintain a water-to-injectant ratio to within a range of about a 15% variation of the midpoint of the mixing ratio range associated with the injectant when water flow rate is no higher than about 4.0 gallons per minute and varies over a range of 20% of the midpoint of the range associated wit the water flow rate.

52. The bathing system of claim 50, wherein the at least one water sprayer and the at least one differential pressure injector being configured to maintain a water-to-injectant ratio to within a range of about a 35% variation of the midpoint of the mixing ratio range associated with the injectant water flow rate is no higher than about 4.0 gallons per minute and varies over a range of 60% of the midpoint of the range associated with the water flow rate.

53. The bathing system of claim 51, wherein the at least one water sprayer and the at least one differential pressure injector being configured to maintain a water-to-injectant ratio to within a range of about a 15% variation of the midpoint of the mixing ratio range associated with the injectant when the water flow rate is varied over a range from about 1.9 to about 2.3 gallons per minute.

54. The bathing system of claim 53, wherein the at least one water sprayer and the at least one differential pressure injector being configured to maintain a water-to-injectant ratio to within a range of about a 35% variation of the midpoint of the mixing ratio range associated with the injectant when the water flow rate is varied over a range from about 1.4 to about 2.6 gallons per minute.

55. The bathing system of claim 50, further comprising a fluid path bypassing the at least one differential pressure injector and a valve in the bypassing path for regulating passage of fluid through the bypassing path.

56. The bathing system of claim 50, wherein the at least one water sprayer is configured to produce a back pressure of no higher than about half of the water pressure at the inlet of the at least one differential pressure injector.

57. The bathing system of claim 56, wherein the at least one water sprayer is configured to produce a back pressure of no higher than about 10 psi when the flow rate through the at least one water sprayer is 1.4 gallons per minute.

58. The bathing system of claim 50, wherein the first injectant dispenser includes at least a non-opaque portion through which the amount of the injectant stored in the first injectant dispenser can be visually inspected from outside.

59. The bathing system of claim 50, further comprising an indicator showing the availability of the injectant to the at least one differential pressure injector.

60. The bathing system of claim 59, wherein the indicator comprises a non-opaque portion of an injectant passageway in fluid communication with the first injectant dispenser and the injectant inlet of the at least one differential pressure injector.

61. The bathing system of claim 59, further comprising a content indicator providing a signal indicative of the amount of the injectant in the first injectant dispenser.

62. The bathing system of claim 50, wherein the at least one water sprayer comprises a pulsating-action sprayer.

63. The bathing system of claim 55, wherein the at least one water sprayer comprises a pulsating-action sprayer.

64. The bathing system of claim 63, wherein the at least one water sprayer is configured to produce a pulsating action using the mixture being projected.

65. The bathing system of claim 50, further comprising:
a second injectant dispenser for storing a second injectant; and
a manifold having intake parts in respective fluid communication with the first and second injectant dispensers and an output port in fluid communication wit the injectant inlet of the at least one differential pressure injector for supplying the first and second injectants to the at least one differential pressure injector.

66. The bathing system of claim 65, further comprising at least one valve for selecting one or both of the first and second injectants to supply to the at least one differential pressure injector.

67. The bathing system of claim 50, wherein the agitator comprises a submersible re-circulation pump disposed inside the first injectant dispenser.

68. The bathing system of claim 50, wherein the agitator comprises a re-circulation pump located outside the first injectant dispenser.

69. The bathing system of claim 50, further comprising:
an additional water sprayer having an inlet and outlet; and
an additional differential pressure injector having a primary inlet in fluid communication to a water source, an outlet in fluid communication to the inlet of the additional water sprayer, and an injectant inlet in fluid communication with the first injectant dispenser, whereby the injectant in the first injectant dispenser can be introduced into the water flowing through both differential pressure injectors and water sprayers.

70. The bathing system of claim 50, wherein the at least one differential pressure injector comprises a passive mixer.

71. The bathing system of claim 50, further comprising a pump for aiding the flow of the injectant to the at least one differential pressure injector.

72. The bathing system of claim 50, further comprising:
a tub for collecting the water-injectant mixture from the at least one water sprayer; and
a pump configured to re-circulate the collected mixture back to the at least one water sprayer through a re-circulation path.

73. The bathing system of claim 72, further comprising a filter having an effective mesh size of about 100 microns or finer, the filter being placed in the re-circulation path.

74. The bathing system of claim 73, wherein the filter has an effective mesh size of about 50 microns or finer.

75. A bathing system for projecting a mixture of water and at least one injectant onto an object for washing the object, the system comprising:
(a) a first injectant dispenser configured to store an injectant;
(b) at least one water sprayer having an inlet and outlet;
(c) a tub for collecting the water-injectant mixture from the at least one water sprayer;
(d) a pump configured to re-circulate the collected mixture back to the at least one water sprayer through a re-circulation path; and
(e) at least one injector having a primary inlet in fluid communication to a water source, an outlet in fluid communication to the inlet of the at least one water sprayer, and an injectant inlet in fluid communication wit the first injectant dispenser, whereby the injectant can be introduced into water flowing through the injector,
the at least one water sprayer and the at least one injector being configured to maintain a water-to-injectant ratio to within a range of about a 50% variation of a midpoint of a mixing ratio range associated with the injectant when water flow rate is no higher tan about 4.0 gallons per minute and varies over a range of 20% of a midpoint of a range associated with the water flow rate.

76. The bathing system of claim 75, wherein the at least one injector comprises a differential pressure injector.

77. The bathing system of claim 76, wherein the at least one water sprayer and the at least one injector being configured to maintain a water-to-injectant ratio to within a range of about a 15% variation of the midpoint of the mixing ratio range associated with the injectant when water flow rate is no higher than about 4.0 gallons per minute and varies over a range of 20% of the midpoint of the range associated wit the water flow rate.

78. The bathing system of claim 76, wherein the at least one water sprayer and the at least one injector being configured to maintain a water-to-injectant ratio to within a range of about a 35% variation of the midpoint of the mixing ratio range associated with the injectant water flow rate is no higher than about 4.0 gallons per minute and varies over a range of 60% of the midpoint of the range associated with the water flow rate.

79. The bathing system of claim 77, wherein the at least one water sprayer and the at least one injector being configured to maintain a water-to-injectant ratio to within a range of about a 15% variation of the midpoint of the mixing ratio range associated with the injectant when the water flow rate is varied over a range from about 1.9 to about 2.3 gallons per minute.

80. The bathing system of claim 79, wherein the at least one water sprayer and the at least one injector being configured to maintain a water-to-injectant ratio to within a range of about a 35% variation of the midpoint of the mixing ratio range associated with the injectant when the water flow rate is varied over a range from about 1.4 to about 2.6 gallons per minute.

81. The bathing system of claim 76, further comprising a fluid path bypassing the at least one injector and a valve in the bypassing path for regulating passage of fluid through the bypassing path.

82. The bathing system of claim 76, wherein the at least one water sprayer is configured to produce a back pressure of no higher than about half of the water pressure at the inlet of the at least one injector.

83. The bathing system of claim 82, wherein the at least one water sprayer is configured to produce a back pressure of no higher than about 10 psi when the flow rate through the at least one water sprayer is 1.4 gallons per minute.

84. The bathing system of claim 82, wherein the first injectant dispenser includes at least a non-opaque portion through which the amount of the injectant stored in the first injectant dispenser can be visually inspected from outside.

85. The bathing system of claim 82, further comprising an indicator showing the availability of the injectant to the at least one injector.

86. The bathing system of claim 85, wherein the indicator comprises a non-opaque portion of an injectant passageway in fluid communication with the first injectant dispenser and the injectant inlet of the at least one injector.

87. The bathing system of claim 85, further comprising a content indicator providing a signal indicative of the amount of the injectant in the first injectant dispenser.

88. The bathing system of claim 76, further comprising an agitator configured to homogenize the injectant stored in the first injectant dispenser.

89. The bathing system of claim 76, wherein the at least one water sprayer comprises a pulsating-action sprayer.

90. The bathing system of claim 81, wherein the at least one water sprayer comprises a pulsating-action sprayer.

91. The bathing system of claim 90, wherein the at least one water sprayer is configured to produce a pulsating action using the mixture being projected.

92. The bathing system of claim 76, further comprising:
a second injectant dispenser for storing a second injectant; and
a manifold having intake ports in respective fluid communication with the first and second injectant dispensers and an output port in fluid communication with the injectant inlet of the at least one injector for supplying the first and second injectants to the at least one injector.

93. The bathing system of claim 92, farther comprising at least one valve for selecting one or both of the first and second injectants to supply to the at least one injector.

94. The bathing system of claim 88, wherein the agitator comprises a submersible re-circulation pump disposed inside the first injectant dispenser.

95. The bathing system of claim 88, wherein the agitator comprises a re-circulation pump located outside the first injectant dispenser.

96. The bathing system of claim 76, further comprising:
an additional water sprayer having an inlet and outlet; and
an additional injector having a primary inlet in fluid communication to a water source, an outlet in fluid communication to the inlet of the additional water sprayer, and an injectant inlet in fluid communication with the first injectant dispenser, whereby the injectant in the first dispenser can be introduced into water flowing through both injectors and water sprayers.

97. The bathing system of claim 75, wherein the at least one injector comprises a passive mixer.

98. The bathing system of claim 76, further comprising a pump for aiding the flow of the injectant to the at least one injector.

99. The bathing system of claim 75, further comprising a filter having an effective mesh size of about 100 microns or finer, the filter being placed in the re-circulation path.

100. The bathing system of claim 99, wherein the filter has an effective mesh size of about 50 microns or finer.

101. A bathing system for projecting a mixture of water and at least one injectant onto an object for washing the object, the system comprising:
(a) a first injectant dispensing means for storing an injectant;
(b) at least one water sprayer means for maintaining a water-to-injectant ratio to within a range of about a 50% variation of a midpoint of a mixing ratio range associated with the injectant when water flow rate into the bathing system is no higher than about 4.0 gallons per minute and varies over a range of 20% of a midpoint of a range associated with the water flow rate, the at least one water sprayer means having an inlet and outlet;
(c) an agitator means for homogenizing the injectant stored in the first injectant dispensing means; and
(d) at least one differential pressure injector means, associated with the first injectant dispensing means, for introducing the homogenized injectant into water flowing through the differential pressure injector means and for maintaining a water-to-injectant ratio to within a range of about a 50% variation of a midpoint of the mixing ratio range associated with the injectant when the water flow rate is no higher than about 4.0 gallons per minute and varies over a range of 20% of the midpoint of the range associated with the water flow rate, the at least one differential pressure injector means having a primary inlet in fluid communication to a water source, an outlet in fluid communication to the inlet of the water sprayer, and an injectant inlet in fluid communication with the first injectant dispensing means.

102. A bathing system for projecting a mixture of water and at least one injectant onto an object for washing the object, the system comprising:
(a) a first injectant dispenser means for storing an injectant;
(b) at least one water sprayer means for maintaining a water-to-injectant ratio to within a range of about a 50% variation of a midpoint of a mixing ratio range associated with the injectant when a water flow rate into the bathing system is no higher than about 4.0 gallons per minute and varies over a range of 20% of a midpoint of a range associated with the water flow rate, the at least one water sprayer means having an inlet and outlet;
(c) a means for collecting the water-injectant mixture from the at least one water sprayer means;
(d) a pump means for re-circulating the collected mixture back to the at least one water sprayer means through a re-circulation path; and
(e) at least one injector means, associated with the first injectant dispenser means, for introducing the injectant into water flowing through the injector means and for maintaining a water-to-injectant ratio to within a range of about a 50% variation of a midpoint of a mixing ratio range associated wit the injectant when the water flow rate is no higher than about 4.0 gallons per minute and varies over a range of 20% of the midpoint of the range associated with the water flow rate, the at least one injector means having a primary inlet in fluid communication to a water source, an outlet in fluid communication to the inlet of the at least one water sprayer, and an injectant inlet in fluid communication with the first injectant dispenser means.

* * * * *

UNITED STATES PATENT AND TRADEMARK OFFICE
CERTIFICATE OF CORRECTION

PATENT NO. : 7,032,840 B2 Page 1 of 1
APPLICATION NO. : 10/165020
DATED : April 25, 2006
INVENTOR(S) : James E. Freidell It is certified that error appears in the above-identified patent and that said Letters Patent is hereby corrected as shown below:

In column 13 at line 8 claim 2 delete "wit" insert --with--
In column 13 at line 43 claim 9 delete "farther" and insert --further--
In column 15 at line 21 claim 29 delete "end" and insert --and--
In column 16 at line 44 claim 50 delete "object" and insert --object,--
In column 16 at line 47 claim 50 delete "injectant" and insert --injectant;--
In column 17 at line 6 claim 51 delete "wit" and insert --with--
In column 17 at line 66 claim 65 delete "parts" and insert --ports--
In column 18 at line 1 claim 65 delete "wit" and insert --with--
In column 18 at line 56 claim 75 delete "wit" and insert --with--
In column 18 at line 63 claim 75 delete "tan" and insert --than--
In column 19 at line 8 claim 77 delete "wit" and insert --with--
In column 19 at line 43 claim 84 delete "82" and insert --76--
In column 19 at line 47 claim 85 delete "82" and insert --76--
In column 20 at line 10 claim 93 delete "farther" and insert --further--
In column 22 at line 9 claim 102 delete "wit" and insert --with--

Signed and Sealed this

Fourteenth Day of April, 2009

JOHN DOLL
*Acting Director of the United States Patent and Trademark Office*